US007610280B2

(12) United States Patent
O'Toole et al.

(10) Patent No.: US 7,610,280 B2
(45) Date of Patent: Oct. 27, 2009

(54) METHOD AND SYSTEM FOR DYNAMICALLY PRE-POSITIONING CONTENT IN A NETWORK BASED DETECTING OR PREDICTING USER PRESENCE

(75) Inventors: James O'Toole, Somerville, MA (US); Stephen Morris, Harvard, MA (US); Anthony Lapolito, Grafton, MA (US)

(73) Assignee: Cisco Technology, Inc., San Jose, CA (US)

( * ) Notice: Subject to any disclaimer, the term of this patent is extended or adjusted under 35 U.S.C. 154(b) by 380 days.

(21) Appl. No.: 11/124,494

(22) Filed: May 5, 2005

(65) Prior Publication Data

US 2006/0253444 A1     Nov. 9, 2006

(51) Int. Cl.
*G06F 17/30* (2006.01)
*G06F 15/16* (2006.01)
(52) U.S. Cl. .............................. 707/5; 707/1; 707/101; 709/217
(58) Field of Classification Search .................. 707/1, 707/5, 101; 709/217, 206, 246; 706/45, 706/46; 705/8
See application file for complete search history.

(56) References Cited

U.S. PATENT DOCUMENTS

| | | | | |
|---|---|---|---|---|
| 5,960,085 | A * | 9/1999 | de la Huerga | 340/5.61 |
| 6,553,376 | B1 * | 4/2003 | Lewis et al. | 707/10 |
| 6,606,648 | B1 | 8/2003 | Mukundan | |
| 6,968,329 | B1 * | 11/2005 | Chung et al. | 706/46 |
| 6,978,246 | B1 * | 12/2005 | Ruvolo et al. | 705/8 |
| 7,007,062 | B1 * | 2/2006 | Serenyi et al. | 709/203 |
| 2002/1000740 | * | 1/2002 | Vange et al. | 709/217 |
| 2003/0018784 | A1 * | 1/2003 | Lette et al. | 709/226 |
| 2003/0208547 | A1 | 11/2003 | Branimir | |
| 2004/0158865 | A1 * | 8/2004 | Kubler et al. | 725/82 |
| 2005/0197995 | A1 * | 9/2005 | Badt et al. | 707/1 |
| 2005/0283574 | A1 * | 12/2005 | O'Neil | 711/137 |
| 2006/0168037 | A1 * | 7/2006 | Audu et al. | 709/206 |
| 2006/0218304 | A1 * | 9/2006 | Mukherjee et al. | 709/246 |

* cited by examiner

*Primary Examiner*—Tony Mahmoudi
*Assistant Examiner*—Dennis Truong
(74) *Attorney, Agent, or Firm*—Trellis IP Law Group, PC

(57) ABSTRACT

A method, system and apparatus are provided for dynamically pre-positioning content from servers located in a network, which may be a content distribution network. The content is pre-positioned on a proxy server, and the pre-positioning is triggered by at least one of the scheduling of an event and the presence of a user. Users commuting between different locations of a company can quickly and easily access the pre-positioned content. This content may be prioritized and pre-positioned, based on a user requiring a specific content at a particular time.

19 Claims, 5 Drawing Sheets

METHOD AND SYSTEM FOR DYNAMICALLY PRE-POSITIONING CONTENT IN A NETWORK BASED DETECTING OR PREDICTING USER PRESENCE

BACKGROUND OF THE INVENTION

1. Field of Invention

Embodiments of the invention relate in general to accessing content in a content distribution network. More specifically, the embodiments of the invention relate to methods and systems for dynamic pre-positioning of content that may be required by users.

2. Description of the Background Art

Users commuting between different offices of a company often need to access content stored on certain servers in a network. This content can be emails, web pages, streaming media, files, database information, and so forth. Users may need to access the content from primary servers, from where it is usually accessed, by downloading the content from its primary location. This results in some delay. The contents of the primary servers may be based on, for example, Post Office Protocol (POP)-based mailbox contents or new emails from an Internet Message Access Protocol (IMAP)-based mailbox.

Conventional servers, for example, POP-based and IMAP-based servers synchronize distributed replicas of the contents for the purpose of redundancy and availability. Further, there are conventional servers that eliminate unnecessary duplication of message content, such as attachments in which multiple recipients' mailboxes contain the same message. The servers can also be aware of the presence of users.

However, while they may be aware of the presence of users, this does not mean that conventional servers automatically pre-position, cache or selectively replicate mailbox content or other content. Further, conventional techniques may not be able to dynamically pre-position the content and accelerate the process of downloading it.

DETAILED DESCRIPTION OF EMBODIMENTS OF THE INVENTION

Various embodiments of the invention provide a method, a system, and a computer-readable medium for accessing content in a content distribution network. In accordance with various embodiments of the invention, the content distribution network may be a distributed client-server network.

In an embodiment of the invention, a method for accessing the content from one or more servers in a network has been provided. In accordance with an embodiment of the invention, the method triggers pre-positioning of the content, based on scheduling of an event. The method also provides pre-positioning of the content, to enable one or more users to access it. In an embodiment of the invention, the pre-positioning can also be triggered, based on the presence of users. In an embodiment of the invention, the pre-positioning can be triggered based on prediction of user presence.

In an embodiment of the invention, a system for accessing content from one or more servers in a network has been provided. This system provides means for triggering and pre-positioning the content on content cache or proxy servers.

Figure 1:
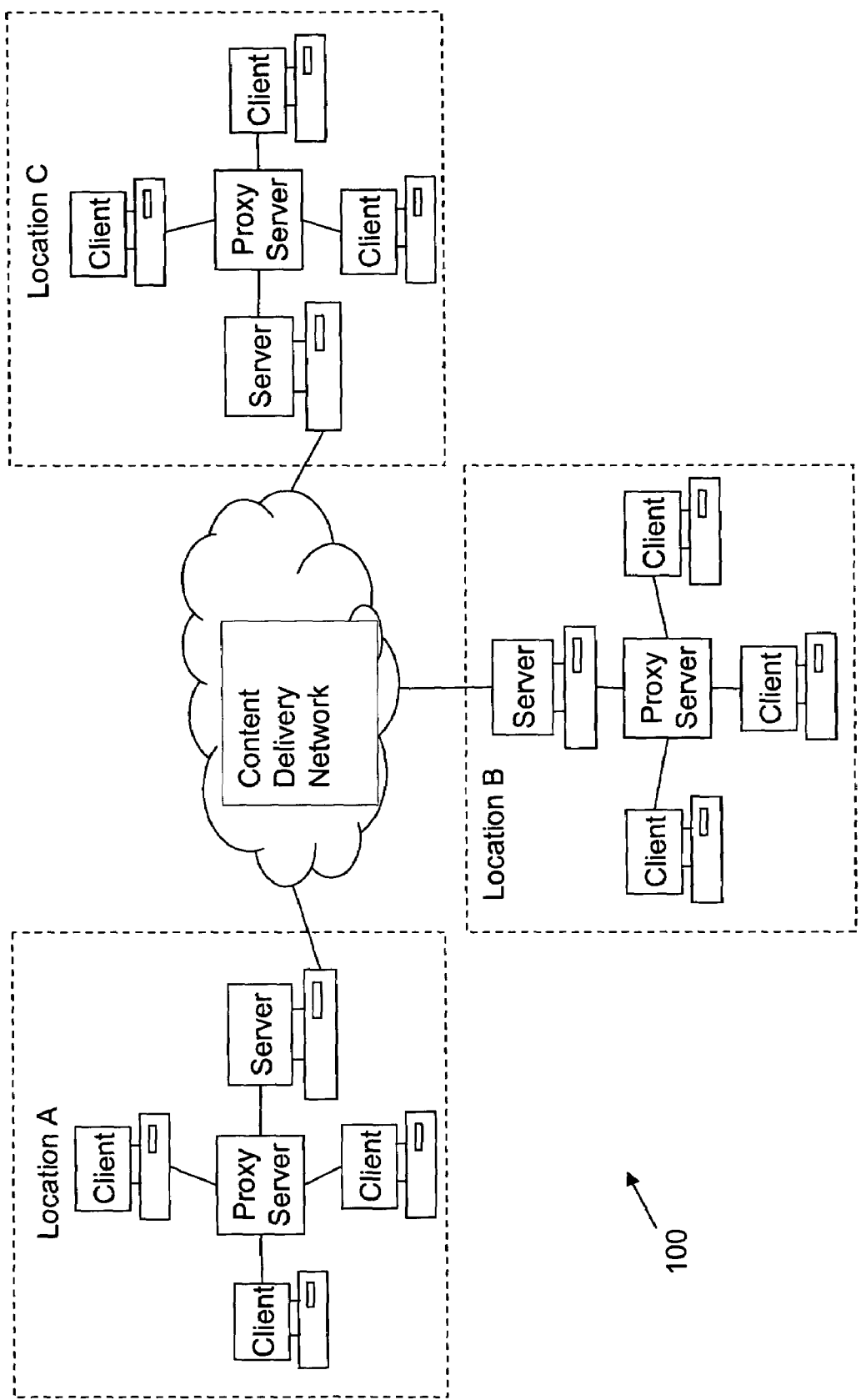
FIG. 1 illustrates a block diagram depicting a content distribution network, in accordance with an exemplary embodiment of the present invention.

FIG. 1 depicts an exemplary network 100 that includes servers, proxy servers and clients at various locations, for example locations A, B and C. In various embodiments of the invention, network 100 can be a content distribution network. In various embodiments of the invention, the content distribution network may also include a content engine, for example, the Cisco™ content engine. Each server, present at various locations, is connected to a plurality of clients through communication channels. Proxy servers act as an intermediary between the clients and the servers and ensure security, administrative control, and caching. Servers, proxy servers and clients may be located at different locations of a company or enterprise. In accordance with an embodiment of the invention, the servers may be differentiated on the basis of their functionalities. For example, the servers at locations A, B and C may include data servers, mail servers, and so forth.

In an embodiment of the invention, one of the servers at locations A, B or C may be the primary content server while the remaining servers can be referred to as secondary servers. The primary and secondary servers ensure that a user traveling through different locations of a company or enterprise can easily access the required content. This content may include emails, web pages, streaming video and audio data, files, and database information. It may also be the mailbox content of a Post Office Protocol (POP)-based mailbox, new email messages from an Internet Message Access Protocol (IMAP) mailbox, etc. Email messages may be retrieved from the mailbox by a desktop email-reader program such as Microsoft® Outlook.

In various embodiments of the invention, users may access the content through the proxy servers that are connected to the servers at the various locations such as locations A, B and C.

Figure 2:
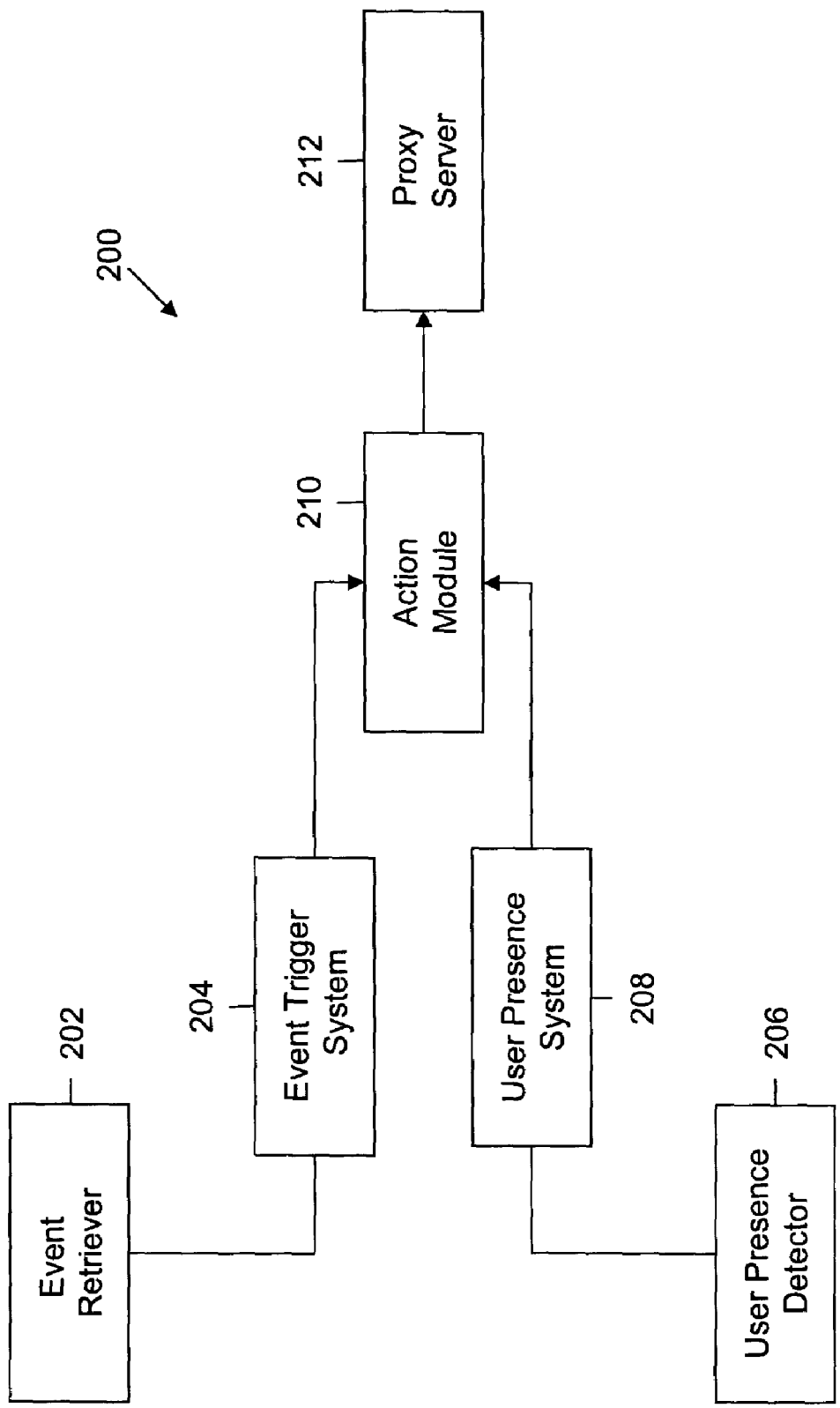
FIG. 2 illustrates a block diagram depicting functional modules of a system that enables access content from one or more servers in a network, in accordance with an exemplary embodiment of the present invention.

FIG. 2 depicts various functional modules of a system 200 that enables access to the servers at various locations such as locations A, B and C. These servers may be available at different locations of a company and may have varying functionalities. In various embodiments of the invention, access is triggered by an event or presence of a user.

System 200 includes an event retriever 202 that retrieves information relating to the scheduling of an event. In various embodiments of the invention, the event may include a meeting, a teleconference or a trip, that is scheduled for a certain time. Event retriever 202 scans one or more data sources to retrieve the information. The data sources include the information records that correlate users' identities, information pertaining to time and place, and the content that may be required by the users. Exemplary data sources are described in conjunction with FIG. 3. The schedules for the events may be provided by the data sources. These schedules may include the identities of users who may be present during the event. They may also include information pertaining to the time and place of the occurrence of the event, and provide information related to the content required by the users during the event.

In various embodiments of the invention, event retriever 202 may be implemented in the form of software, firmware, hardware or their combination thereof.

Further, system 200 may include an event trigger system 204 for triggering pre-positioning of the content, based on the information retrieved by event retriever 202. In various embodiments of the invention, event trigger system 204 may reside in at least one of the servers located at, for example, location A, B or C. In accordance with an embodiment of the invention, event trigger system 204 may reside on a dedicated server present in network 100. In various embodiments of the invention, event trigger system 204 may be implemented in the form of software, firmware, hardware or their combination thereof.

Further, a user presence detector 206 detects a user who may be present at any of clients located in network 100. In an embodiment of the invention, the pre-positioning can be triggered based on prediction of user presence. In various embodiments of the invention, user presence detector 206 may be implemented in the form of software, firmware, hardware or their combination thereof.

User presence detector 206 retrieves information related to user identities and tracks the presence of a user. This information includes details pertaining to the identity of users who may require the content on a particular day, and may include names, designations, online time, idle time, present status of the users, and so forth. For example, it may be indicated whether a user is active, busy, idle, or is not logged on network 100.

User presence system 208 receives the information from user presence detector 206 and triggers an action module 210 for pre-positioning the content. In an embodiment of the invention, user presence system 208 may also trigger action module 210 based on predictive user presence. Action module 210 may be triggered through at least one event trigger system 204 or one user presence system 208. Action module 210 pre-positions the content (based on the event or the user presence trigger) that may be required by the users. Action module 210 also correlates the information obtained from event trigger system 204 and user presence system 208, and accordingly prioritizes the content.

In various embodiments of the invention, user presence system 208 and action module 210 may be implemented in the form of software, firmware, hardware or their combination thereof.

The prioritized content may be pre-positioned on a proxy server 212. Proxy servers 212 may be, for example, content servers that are specifically available for the clients and servers at locations A, B and C. In an embodiment of the invention, proxy server 212 may be any of the server located at location A, B or C, and may be acting like proxy server 212 for the corresponding clients, wherein the occurrence of an event has been scheduled or the user's presence has been detected. In another embodiment of the invention, proxy servers 212 may include servers located at individual departments, such as the academic units of a university, entire enterprises, and Internet Service Providers (ISPs). In various embodiments of the invention, proxy server 212 may be Cisco™ Content Engine, which primarily operates for streaming media and Hyper Text Transport Protocol (HTTP)-accessible files, and may be associated with particular users or events.

The pre-positioned content may be subsequently stored on a content cache or proxy server 212, so that it may be quickly accessed through proxy server 212.

Figure 3:
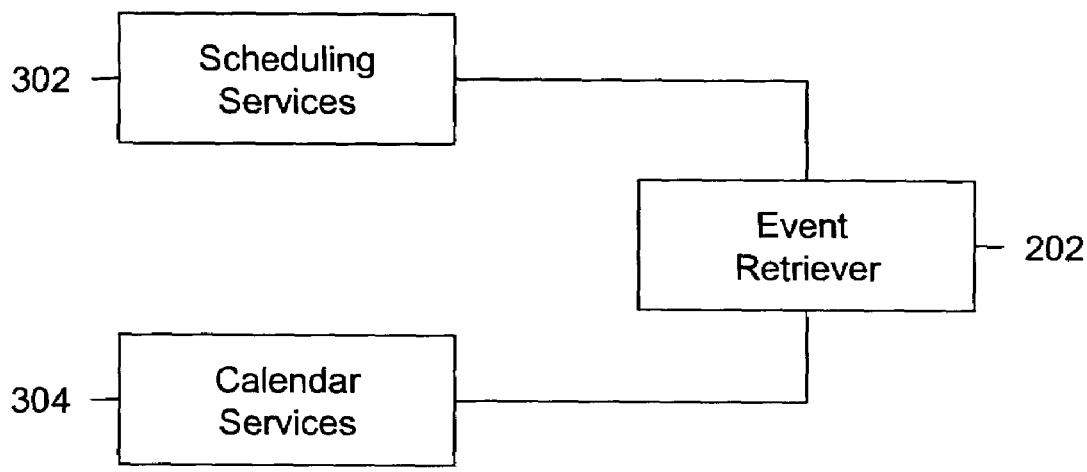
FIG. 3 illustrates a block diagram depicting an event retriever, in accordance with an exemplary embodiment of the present invention.

In various embodiments of the invention, the schedule of an event is retrieved by event retriever 202 through various applications already running on various devices in network 100. The devices in network 100 may be the servers or the clients available at locations A, B and C. FIG. 3 depicts an exemplary event retriever 202, which may retrieve information relating to the scheduling of the event from at least one of the data sources. The data sources may be, for example, scheduling services 302 and calendar services 304, which are available over the devices in network 100. In an embodiment of the invention, scheduling services 302 may be Meeting Maker that is provided by ON Technologies. In an embodiment of the invention, calendar services 304 may be Microsoft® Exchange Calendar or Microsoft® Outlook calendar function. In an embodiment of the invention, event retriever 202 may be a calendar scanner that periodically retrieves various entries from scheduling services 302 or calendar services 304. Event retriever 202 may parse records obtained for meetings, which may be scheduled to take place within a certain time period in the future. In an embodiment of the invention, this time period may be two days. In another embodiment of the invention, the time period may be 16 hours. Event retriever 202 may also extract user identities, along with references to relevant content from the description of events or their agenda. For example, relevant content for an event, such as a meeting, may be a PowerPoint presentation, relevant specifications and documents for review, etc.

Figure 4:
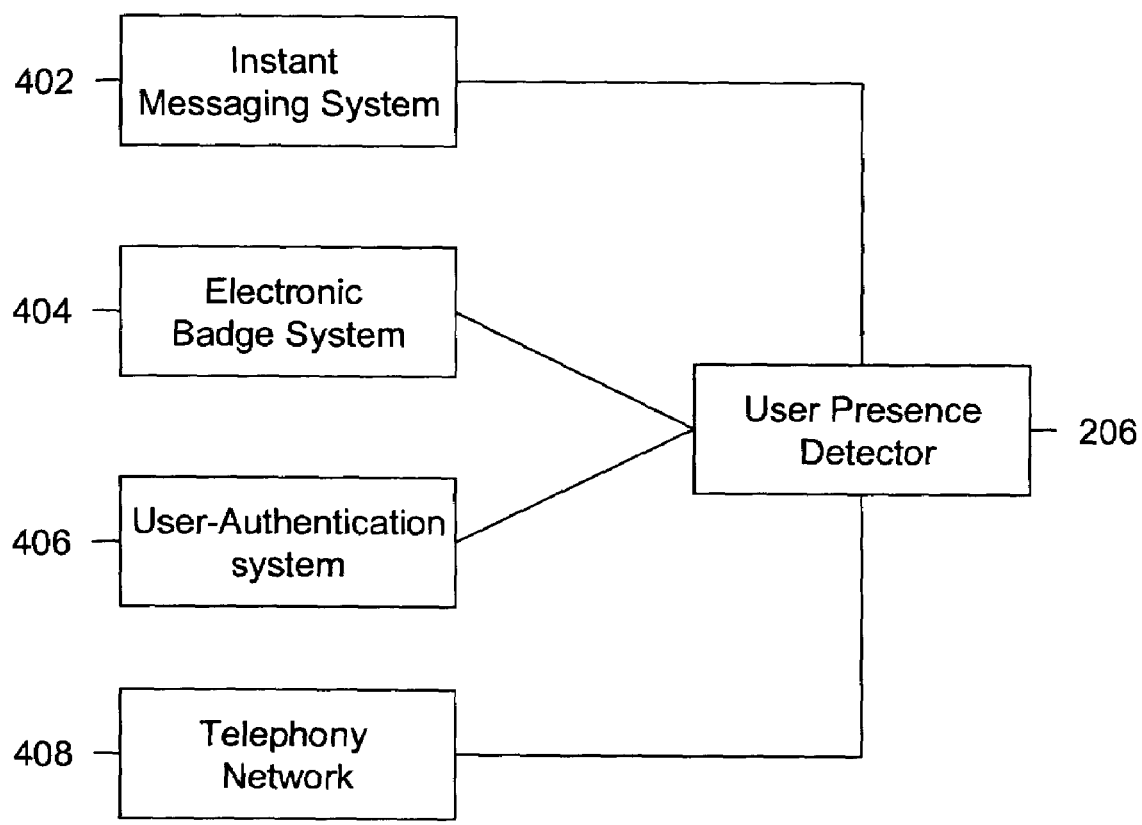
FIG. 4 illustrates a block diagram depicting a user presence detector, in accordance with an exemplary embodiment of the present invention.

As described above, the pre-positioning of the content can be triggered by either event trigger system 204 or user presence system 208. In an embodiment of the invention, event trigger system 204 triggers the pre-positioning of the content, based on the information retrieved by event retriever 202. In another embodiment of the invention, user presence system 208 triggers the pre-positioning of the content, based on user presence detection on any of the clients at locations A, B and C. FIG. 4 depicts an exemplary user presence detector 206, which may retrieve information relating to the presence of a user from an instant messaging system 402. The user's presence may also be detected, based on an electronic badge system 404. A user-authentication system 406 or a telephony network 408 may also be present in network 100, to assist in the detection of the user's presence by user presence detector 206.

Figure 5:
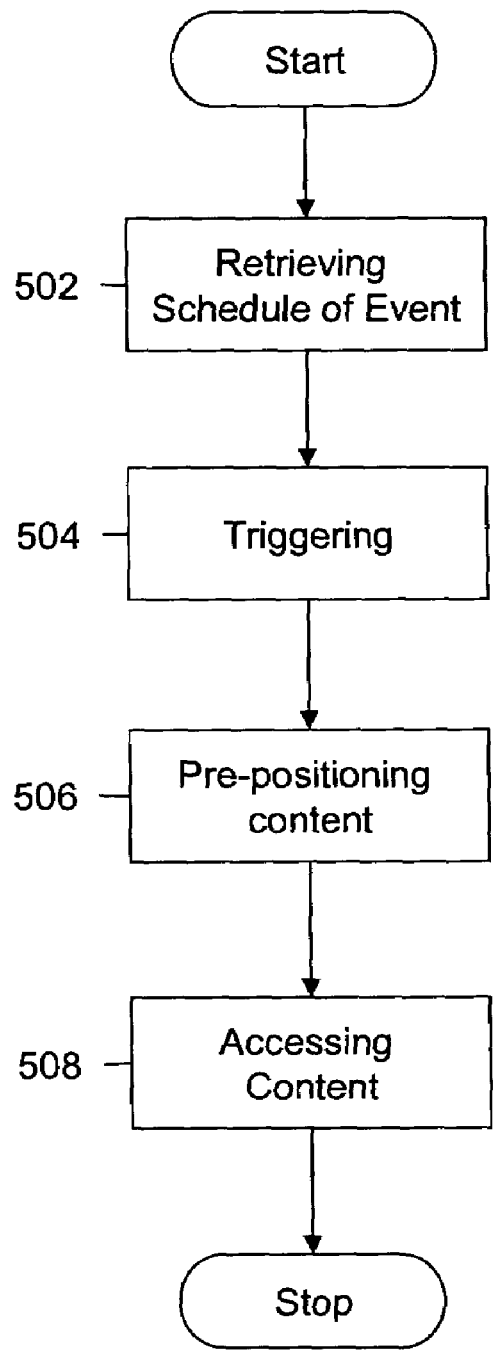
FIG. 5 is a flow chart depicting a method for accessing content in the network, in accordance with an exemplary embodiment of the present invention.

FIG. 5 is a flow chart depicting a method for accessing the content in network 100, in accordance with an exemplary embodiment of the invention. At step 502, event retriever 202 retrieves the schedule of an event. After the schedule of the event is retrieved at step 502, content identifiers, user identifiers, time and place information relating to the event are obtained by event trigger system 504.

In an embodiment, the schedules of the events may include information pertaining to the time and place related to the occurrence of the event. The schedules of the events may also include a user identifier, related to the users, who will be present during the event. In accordance with an embodiment of the invention, the content identifiers relate to the content that may be required by the user. In accordance with another embodiment of the invention, the content identifiers may be obtained from previous schedules of events of a similar nature.

The retrieval of the event triggers the pre-positioning of relevant content. Accordingly, at step 506, action module 210 pre-positions the content that may be required by the user. This pre-positioning of content is performed in response to the triggering at step 504. In accordance with various embodiments of the invention, the content is pre-positioned on proxy server 212. At step 508, the content is accessed by the user through proxy server 212. When required by the user, the content may be quickly downloaded from proxy server 212.

Figure 6:
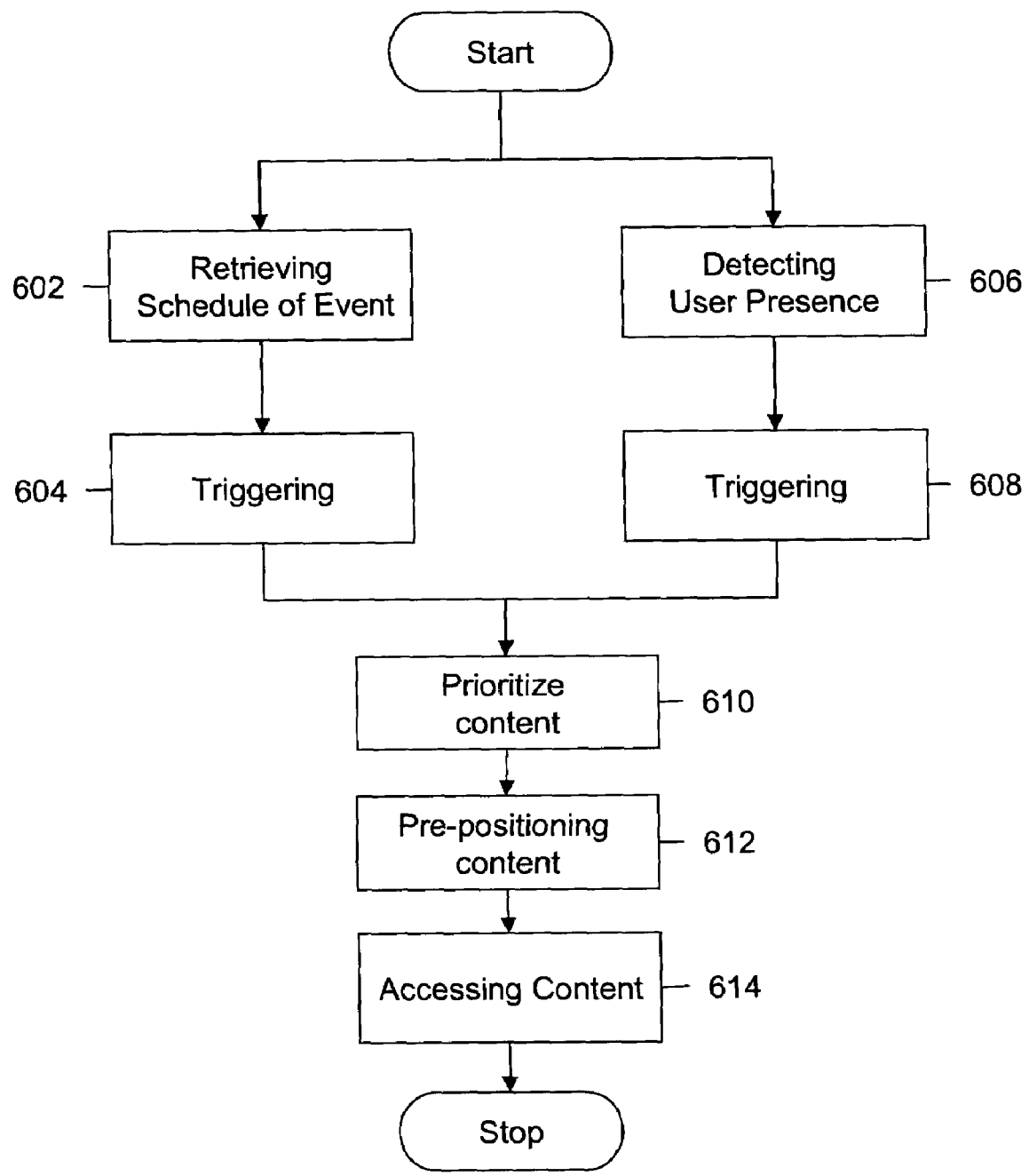
FIG. 6 is a flow chart depicting a method for triggering pre-positioning of the content, in accordance with an exemplary embodiment of the present invention.

FIG. 6 illustrates a flow chart depicting a method for triggering, in accordance with various embodiments of the invention. At step 602, event retriever 202 retrieves the schedules of the events. At step 604, the pre-positioning of content is triggered by event trigger system 204.

At step 606, user presence detector 206 may detect the presence of a user. User presence detector 206 retrieves information about users that are most likely to be accessing certain content on a particular day, or during the occurrence of an event. In accordance with various embodiments of the invention, the information may be retrieved in various ways.

In accordance with an embodiment of the invention, the information may be retrieved from, for example, corporate user authentication systems 406 through notifications. These notifications may indicate the presence of a user, and also the approximate Internet Protocol (IP) address of a client at a certain location, which may have carried out the authentication check for the user. For example, the authentication check may be performed by using the Institute of Electrical and Electronics Engineering (IEEE) 802.1x (IEEE) protocol. In accordance with another embodiment of the invention, telephony system 408 or instant messaging system 402 may provide information indicating that a particular user is active on a certain client 108, 110 or 112. In accordance with yet another embodiment of the invention, electronic building-entry authorization logs, for example, electronic badge system 404, may be used to provide enhanced user-presence tracking.

At step 608, the pre-positioning of the content is triggered by user presence system 208. The presence of the user at a particular location within network 100 triggers pre-positioning of the content that is most likely to be required by the user. In accordance with an embodiment of the invention, the users are most likely to make a request for typical daily activities or emails from mailbox servers.

In an embodiment of the invention, user presence system 208 may use predictive user presence for triggering pre-positioning of the content. In an embodiment of the invention, an observed pattern of user presence may be retrieved by user presence detector 206. In an embodiment of the invention, the pattern of user presence may predict the presence of a user at a particular location on a particular day. The content may thus be pre-positioned on proxy server of that particular location even before the arrival of the user. In an embodiment of the invention, the content may be pre-positioned without any scheduling for the event. For example, the pattern of user presence may indicate that a user is present on location A on Monday, Thursday and Friday, and on location B on Tuesday and Wednesday. Accordingly, user presence system 208 may trigger pre-positioning of the content in the future based on the observed pattern of user presence. In an embodiment of the invention, the presence of a senior person of a company or an enterprise (detected, predicted, or scheduled) may cause a prediction that some support staff for that person may also be present (i.e., their admin.). Most likely, a senior person's administrative staff would also be present at the same location with him or her. In an embodiment of the invention, the content required by the administrative staff can also be pre-positioned along with the content required by the senior person.

At step 610, the content is prioritized, based on the triggering information. In an embodiment of the invention, the content may be prioritized by action module 210. In accordance with an embodiment of the invention, the content may be prioritized, depending on the user-presence detection at step 606. In accordance with an embodiment of the invention, the content may be prioritized, depending on retrieval of the schedule of the event at step 602. In accordance with another embodiment of the invention, the triggering information is processed in accordance with specific weights, to prioritize the pre-positioning of the content. Accordingly, different weights are awarded to the diverse information retrieved by user presence system 208 and event trigger system 204. In an embodiment of the invention, different priorities may be assigned to scheduling services 302, calendar services 304, instant messaging system 402, electronic badge system 404, user-authentication system 406, telephony network 408, and their combinations thereof. In accordance with an embodiment of the invention, the POP mailbox content may be assigned, to be pre-positioned within a few seconds of the electronic user badge being detected. In accordance with another embodiment of the invention, Microsoft® PowerPoint files may be pre-positioned for a meeting that may take place within 24 hours of the detection. The content may also be pre-positioned as a result of the user being authenticated by a local wireless network. The content may be further pre-positioned, as a result of the user's expected participation in upcoming meetings and teleconferences. Accordingly, certain references to web-resident documents or file-server-resident documents may be retrieved from calendar services 304. These files can be accessed from proxy server 212, for example, an HTTP-cache or a Common Internet File System (CIFS) cache.

After prioritization of the content, at step 612, action module 210 pre-positions the content that may be required by the user. In various embodiments of the invention, this content is pre-positioned on proxy server 212. Subsequently, at step 614, the content is accessed by the user through proxy server 212. When required by the user, this content can be easily downloaded from proxy server 212.

The embodiments of the present invention have the advantage that users commuting between different locations of the company or enterprise are provided with easy and fast access to contents available at servers at locations A, B and C. The prioritized content is pre-positioned onto proxy servers 212, and therefore can be accessed quickly. The pre-positioning is triggered by at least one event or the presence of a user. The various embodiments of the invention provide methods and systems that make use of the presence of users and calendar data, to guide the process of pre-positioning of the content before the content is actually required by the users.

The various embodiments of the invention also facilitate dynamic and automatic pre-positioning of contents that may be required by the users. The various embodiments further facilitate pre-positioning of the contents, even before the user's presence is detected on one of the devices, thereby providing good availability.

Although the invention has been discussed with respect to specific embodiments thereof, these embodiments are merely illustrative, and not restrictive, of the invention.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images.

A "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

Reference throughout this specification to "one embodiment", "an embodiment", or "another embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in another embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for accessing content from one or more servers in a network, the method comprising:
  parsing a data source to determine event information for a scheduled event at a first location;

determining user presence information that is detected based on a user being present at a second location, the user presence information determined based on active presence detected for the user at the second location;

determining first content that is deemed likely that a user will access while present at the first location and second content that is deemed likely that the user will access while present at the second location;

determining a priority for pre-positioning the first and second content based on different priorities assigned to the event information for the scheduled event and the user presence information based on active presence, wherein one of the first or second content is determined to be of a higher priority; and automatically pre-positioning the first or second content based on the determined priority, the determined priority pre-positioning the first content before the second content or the second content before the first content based on whichever the first or second content is determined to be of the higher priority, the pre-positioning performed by moving the first or second content from a first storage location to a second storage location to enable quicker access the accessing of the first or second content by the user from the second storage location while the user is at the first location or second location.

2. The method of claim 1 further comprising pre-positioning the content based on user presence detection.

3. The method of claim 2 wherein the user presence detection is based on an instant messaging system.

4. The method of claim 2 wherein the user presence detection is based on a user badge system.

5. The method of claim 2 wherein the user presence detection is based on a user-authentication system.

6. The method of claim 2, wherein the user presence detection is based on a telephony network.

7. The method of claim 2 further comprising triggering the pre-positioning of the content based on a predictive user presence.

8. The method of claim 7 further comprising prioritizing the content based on at least one of the user presence detection, prediction and the scheduling of the event.

9. A system for accessing content from one or more servers in a network, the system comprising:

means for parsing a data source to determine event information for a scheduled event at a first location;

means for determining user presence information that is detected based on a user being present at a second location, the user presence information determined based on active presence detected for the user at the second location;

means for determining first content that is deemed likely that a user will access while present at the first location and second content that is deemed likely that the user will access while present at the second location;

means for determining a priority for pre-positioning the first and second content based on different priorities assigned to the event information for the scheduled event and the user presence information based on active presence, wherein one of the first or second content is determined to be of a higher priority; and means for automatically pre-positioning of the first or second based on the determined priority, the determined priority pre-positioning the first content before the second content or the second content before the first content based on whichever the first or second content is determined to be of the higher priority, the pre-positioning performed by moving the first or second content from a first storage location to a second storage location to enable quicker access of the first or second content by the user from the second storage location while the user is at the first location or second location.

10. A system for accessing content from one or more servers in a network, the system comprising:

an event trigger system for parsing a data source to determine event information for a scheduled event at a first location;

determining user presence information that is detected based on a user being present at a second location, the user presence information determined based on active presence detected for the user at the second location;

determining first content that is deemed likely that a user will access while present at the first location and second content that is deemed likely that the user will access while present at the second location;

determining a priority for pre-positioning the first and second content based on different priorities assigned to the event information for the scheduled event and the user presence information based on active presence, wherein one of the first or second content is determined to be of a higher priority;

an action module for automatically pre-positioning the first or second content based on the determined priority, the determined priority pre-positioning the first content before the second content or the second content before the first content based on whichever the first or second content is determined to be of the higher priority, the pre-positioning performed by moving the first or second content from a first storage location to a second storage location to enable quicker access of the first or second content by the user from the second storage location while the user is at the first location or second location; and a proxy server for storing the whichever of the first or second content being pre-positioned.

11. The system of claim 10 further comprising a user-presence system for triggering pre-positioning of the content based on a user presence.

12. The system of claim 10 further comprises an event retriever for retrieving the schedule of the event.

13. The system of claim 10, wherein the user presence system comprises a user presence detector for at least one of detecting and predicting the presence of one or more user, the user requesting access to the content.

14. A computer-readable storage medium including instructions executable by the processor for accessing content from one or more servers in a network, the computer-readable storage medium comprising:

one or more instructions for parsing a data source to determine event information for a scheduled event at a first location;

one or more instructions for determining user presence information that is detected based on a user being present at a second location, the user presence information determined based on active presence detected for the user at the second location;

one or more instructions for determining first content that is deemed likely that a user will access while present at the first location and second content that is deemed likely that the user will access while present at the second location;

one or more instructions for determining a priority for pre-positioning the first and second content based on different priorities assigned to the event information for the scheduled event and the user presence information based on active presence, wherein one of the first or second content is determined to be of a higher priority; and one or more instructions for automatically pre-positioning the first or second content based on the determined priority, the determined priority pre-positioning the first content before the second content or the second content before the first content based on whichever the first or second content is determined to be of the higher priority, the pre-positioning performed by moving the first or second content from a first storage location to a second storage location to enable quicker access of the first or second content by the user from the second storage location while the user is at the first location or second location.

15. The method of claim 1, further comprising determining if the user is expected to be present at the event by analyzing the event information to determine a user identifier for the user that is used to schedule the event and associating the user identifier with the user.

16. The method of claim 1, wherein determining first content that is deemed likely that the user will access comprises determining a content identifier from the event information and associating the content identifier with the first content.

17. The computer-readable storage medium of claim 14, further comprising one or more instructions for determining content that is deemed likely that the user will access includes one or more instructions for determining a content identifier from the event information and associating the content identifier with the content.

18. The method of claim 1, wherein the priority weightings are based on a priority of the user needing to access the first content or the second content.

19. The method of claim 1, further comprising: processing the first and second content to determine the different priorities to assign based on a type of information associated with the first and second content; and assigning the different priorities to the first and second content based on the processing.

* * * * *